(12) United States Patent
Beyette, Jr. et al.

(10) Patent No.: US 7,359,438 B2
(45) Date of Patent: Apr. 15, 2008

(54) OPTICAL COMMUNICATIONS IMAGER

(75) Inventors: Fred R. Beyette, Jr., Cincinnati, OH (US); Darryl S. Dieckman, Cincinnati, OH (US); Dale E. Martin, Cincinnati, OH (US); Philip A. Wilsey, Cincinnati, OH (US)

(73) Assignee: Clifton Labs, Inc., Cincinnati, OH (US)

( * ) Notice: Subject to any disclaimer, the term of this patent is extended or adjusted under 35 U.S.C. 154(b) by 522 days.

(21) Appl. No.: 10/305,626

(22) Filed: Nov. 27, 2002

(65) Prior Publication Data

US 2004/0101308 A1 May 27, 2004

(51) Int. Cl.
*H04N 7/12* (2006.01)

(52) U.S. Cl. .................... 375/240.01; 375/240

(58) Field of Classification Search ........... 375/240.01, 375/240, 257; 715/500.1; 356/28.5; 600/558; 348/207.1, 207.11, 211.1, 211.2, 211.3, 218.1; 382/307, 324
See application file for complete search history.

(56) References Cited

U.S. PATENT DOCUMENTS

| 5,611,038 | A | * | 3/1997 | Shaw et al. ............... 715/500.1 |
| 5,694,495 | A | * | 12/1997 | Hara et al. .................. 382/324 |
| 5,727,025 | A | * | 3/1998 | Maryanka ................... 375/257 |
| 6,034,760 | A | * | 3/2000 | Rees .......................... 356/28.5 |
| 6,120,461 | A | * | 9/2000 | Smyth ........................ 600/558 |
| 6,310,987 | B1 | * | 10/2001 | Koyama ..................... 382/307 |

* cited by examiner

*Primary Examiner*—Allen Wong
(74) *Attorney, Agent, or Firm*—Guerin & Rodriguez, LLP; William G. Guerin

(57) ABSTRACT

Described are a method and optical communications processor for receiving communications data in an image formed on a plurality of pixels. The method includes receiving active pixel information identifying which of the pixels are receiving communications data and retrieving communications data from each of the pixels identified by the active pixel information. A list of active data communication channels is generated in response to the active pixel information. The active pixel information can be in the form of active pixel flag bits. Optionally, the method also includes receiving video data from the pixels.

13 Claims, 7 Drawing Sheets

OPTICAL COMMUNICATIONS IMAGER

GOVERNMENT RIGHTS IN THE INVENTION

This invention was made with United States government support under Contract No. DAAD19-02-C-0034 awarded by the U.S. Army Research Office. The government may have certain rights in the invention.

FIELD OF THE INVENTION

The invention relates generally to optical data communications and imaging arrays. More particularly, the invention relates to a system and method for multiple, simultaneous optical data communications using a single imaging device.

BACKGROUND

High-speed secure wireless data transmission is a vital component for future military, industrial, and commercial applications. Although current radio-frequency (RF) systems provide wireless data communications, this approach is limited by a lack of information security and by significantly reduced data bandwidth when a large number of communications channels are required.

Free space (i.e., line-of-sight) optical communication can improve data security and bandwidth, however, the communication hardware necessary to support a large network of sensors requires a communication bandwidth that can not be achieved with existing electronic integrated circuit (IC) technology.

A free space multi-channel optical communication system requires tracking the spatial location of communication sources along their line of sight (LOS) paths. In addition, the communication system requires a field of view sufficient to receive data from widely separated communication sources. The system must also be able to separate the communication channels according to the location of the communication sources in the field of view. The communication sources can be moving relative to the communication system or to each other, therefore, the communication system needs to track each source as the source position changes within the system field of view. Optical image capture systems can be configured to collect data over a large field of view, however, currently such systems are not suited for high-speed digital data transmission from multiple communication sources.

What is needed is an optical communications imager that is suitable for parallel and secure, high speed data communications with a network of distributed mobile communications nodes. The optical communications imager should be able to establish and maintain high data rate communications with each of the communication nodes.

SUMMARY

In one aspect, the invention features an optical communications processor for providing communications data from an optical sensor having a plurality of pixels. The processor includes a video module adapted to receive video data from the optical sensor and a data module adapted to receive communications data from one or more pixels in the optical sensor. The data module is adapted to generate at least one data communications channel in response to the communications data from the one or more pixels in active communication. In one embodiment, the processor also includes a host link controller in communication with the video module and the data module. In another embodiment, the processor also includes a video controller adapted to receive video data from the optical sensor. In yet another embodiment, the data module includes a data channel controller. In a further embodiment, the processor also includes a plurality of active channel buffers in communication with the data channel controller.

In another aspect, the invention features a method for receiving communications data in an image formed on a plurality of pixels. The method includes receiving active pixel information identifying which of the pixels are receiving communications data and retrieving communications data from each of the pixels identified by the active pixel information. In one embodiment, the method also includes generating a list of active communications data channels in response to the active pixel information. In another embodiment, the active pixel information includes a plurality of active pixel flag bits.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Figure 1:
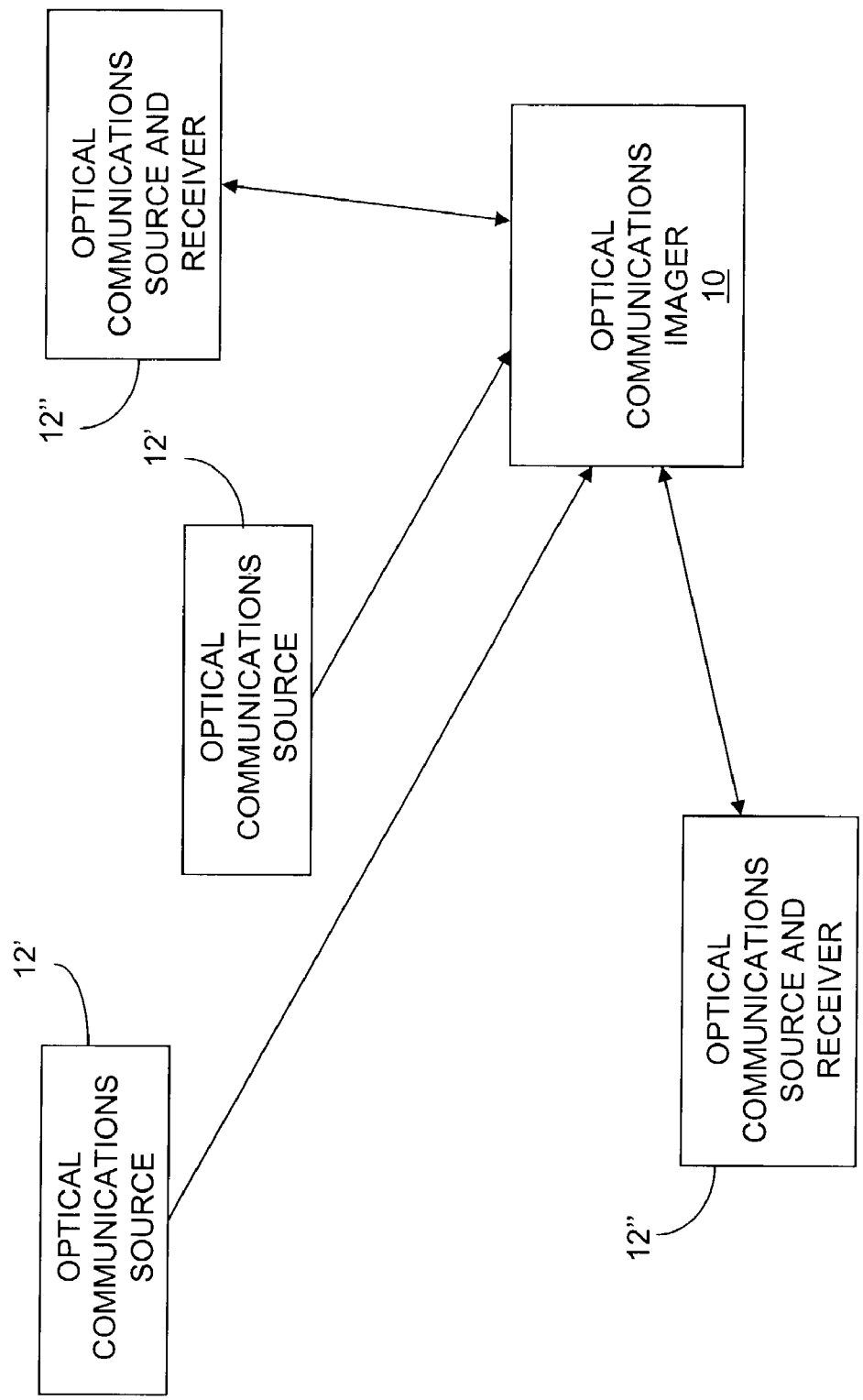
FIG. 1 is an illustration of an embodiment of an optical communications imager receiving communications data from multiple optical communication sources in accordance with the invention.

In brief overview, the present invention relates to an optical communications imager for parallel (i.e., multiple simultaneous) and secure data reception from a network of distributed communications sources. FIG. 1 is a high level depiction of an embodiment of an optical communications imager 10 receiving communications data from four separate optical communication nodes 12 according to the present invention. The communications imager 10 can be an independent communications node or it can be integrated into a personal portable device or mobile platform. Each node 12 includes either an optical communications source 12' or an optical communications source and receiver 12". In one embodiment, the receiver is an optical communications imager 10.

Each communication node 12 is located at a different angular position and a different distance from the optical communications imager 10. An optical transmitter is included in each node 12 to generate an optical beam having a data communications signal that illuminates the optical communications imager 10. The optical transmitter includes a laser, a light-emitting diode (LED), or other optical device capable of generating an optical intensity at the communications imager 10 that exceeds the background illumination and general features in the image scene. In some embodiments, the optical communications imager 10 is part of a communications system that also includes an optical communications source 12' to enable two-way optical communications with bi-directional communication nodes 12".

In some embodiments the communications imager 10 is adapted to track and communicate with one or more mobile communication nodes 12. In these embodiments, the position of each mobile communication node 12 in the field of view of the communications imager 10 changes with time, with each node 12 generally having a different velocity. The optical communications imager 10 tracks the position of the various nodes 12, establishes a communication channel for each node 12, and provides image data or video data for the detected image.

Figure 2:
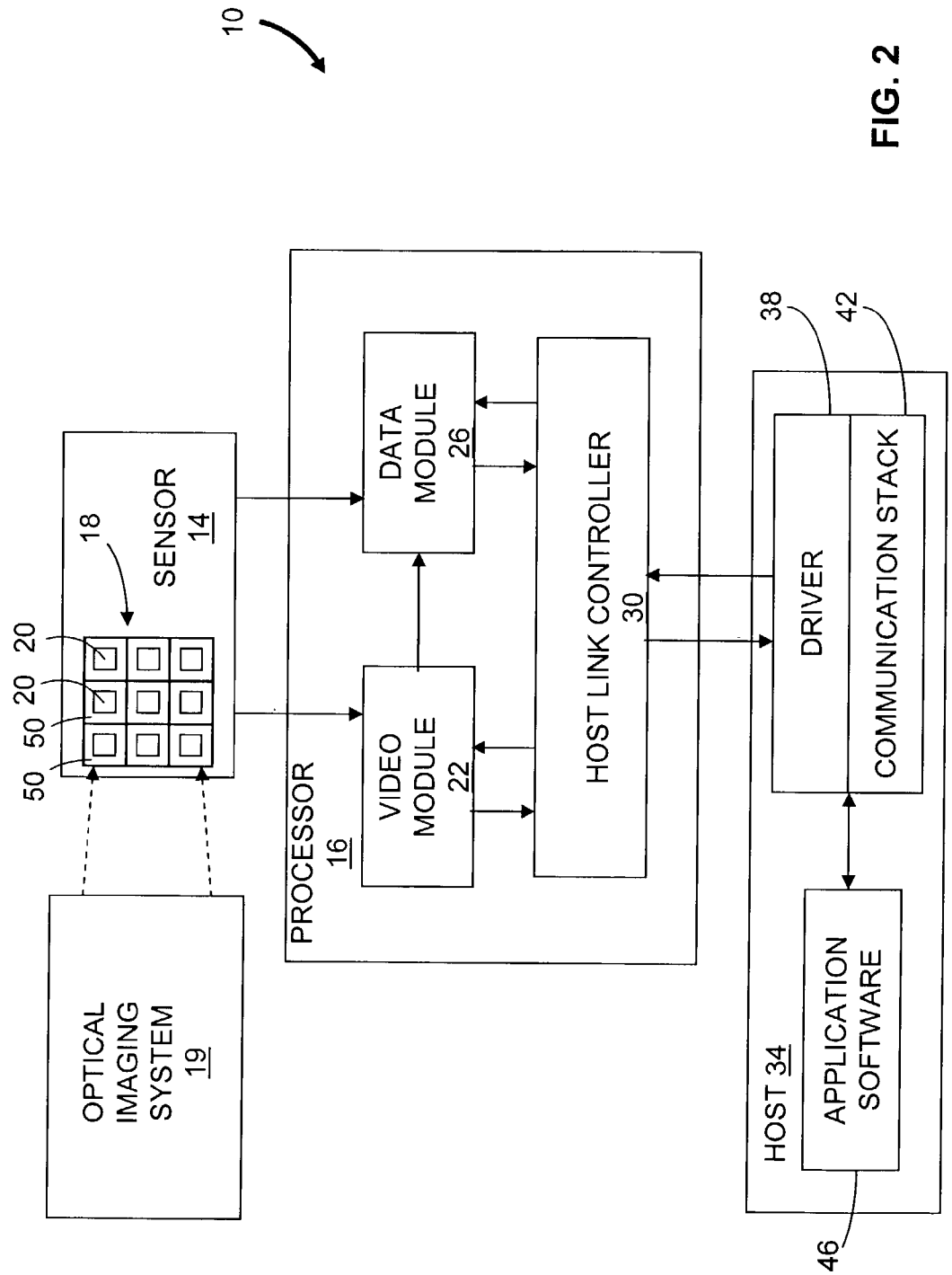
FIG. 2 is an illustration of an embodiment of an optical communications imager in accordance with the invention.

Referring to FIG. 2, one embodiment of the optical communications imager 10 includes a sensor 14 in communication with a processor 16. The sensor 14 has image capture and data communications capture capabilities. The sensor 14 includes an imaging array 18 that receives an image formed by an optical imaging system 19, such as a camera lens system. Each optical detector 20 in the imaging array 18 generates an electrical signal in response to incident light. Each optical detector 20 is integrated into a pixel 50 that includes additional components used for image data and communications data processing.

The processor 16 includes a video module 22, a data module 26 and a host link controller 30. The video module 22 and the data module 26 are in communication with the sensor 14 and the host link controller 30, and with each other. The processor 16 is configurable according to the requirements of specific system applications and manages the allocation of sensor bus bandwidth to optimize transfer of both video data and communication data during communication with all active optical communication nodes 12 (FIG. 1).

In the illustrated embodiment, the optical communications imager 10 also includes a host computer 34 in communication with the host link controller 30. In one embodiment, the host computer 34 is a commercially available computer (e.g., a personal computer (PC)). In another embodiment, the host computer 34 includes the processor 16. For example, the processor 16 can be implemented inside the host computer 34 as a circuit board or a module on a circuit board. The host computer 34 interfaces with the host link controller 30 using a standard data transfer protocol such as universal serial bus (USB), Firewire (e.g., IEEE 1394), or Ethernet (e.g., IEEE 802.3). In another embodiment the computer 34 interfaces with the host link controller 30 using a standard bus interface protocol such as Industry Standard Architecture (ISA), Peripheral Component Interconnect (PCI), or Personal Computer Memory Card International Association (PCMCIA). The host computer 34 includes a driver 38, a communication protocol stack 42 for communication through the host link controller 30, and a software module 46 to support end user software applications adapted for processing the video data and the communications data. The driver 38 is a software component that manages the data transfer between the host computer 34 and the host link controller 30 of the processor 16. The driver 38 interfaces with a standard communications stack 42 to provide application developers with a standard interface for integrating video data and communications data into specific applications. Thus application developers can develop a variety of applications that require video acquisition, high-speed optical communications, and communication source tracking.

In operation, the optical imaging system forms an optical image, including one or more optical communication sources 12, on the sensor 14. The image is incident on the imaging array 18 with each detector 20 sensing the intensity over a small spatial region of the image. If light from a communication node 12 is incident on the detector 20, the intensity varies rapidly according to the characteristics of the data communications signal transmitted by the node 12. Video data are provided by the sensor 14 to the video module 22 and communications data are provided by the sensor 14 to the data module 26. In addition, the sensor 14 provides active pixel information such as an active pixel flag bit (i.e., a bit indicating that the pixel has detected the presence of optical communications data) to the video module 22 that identifies which detectors 20 are actively receiving a data communications signal. The data module 26 maintains a data channel for each optical communication node 12 in response to the communications data generated by the sensor 14 and the information provided by the video module 22 identifying the detectors 20 receiving communications data. The host link controller 30 processes commands received from the host computer 34 and formats and delivers data from the video module 22 and data module 26 to the host computer 34 according to the data transfer protocol.

Figure 3:
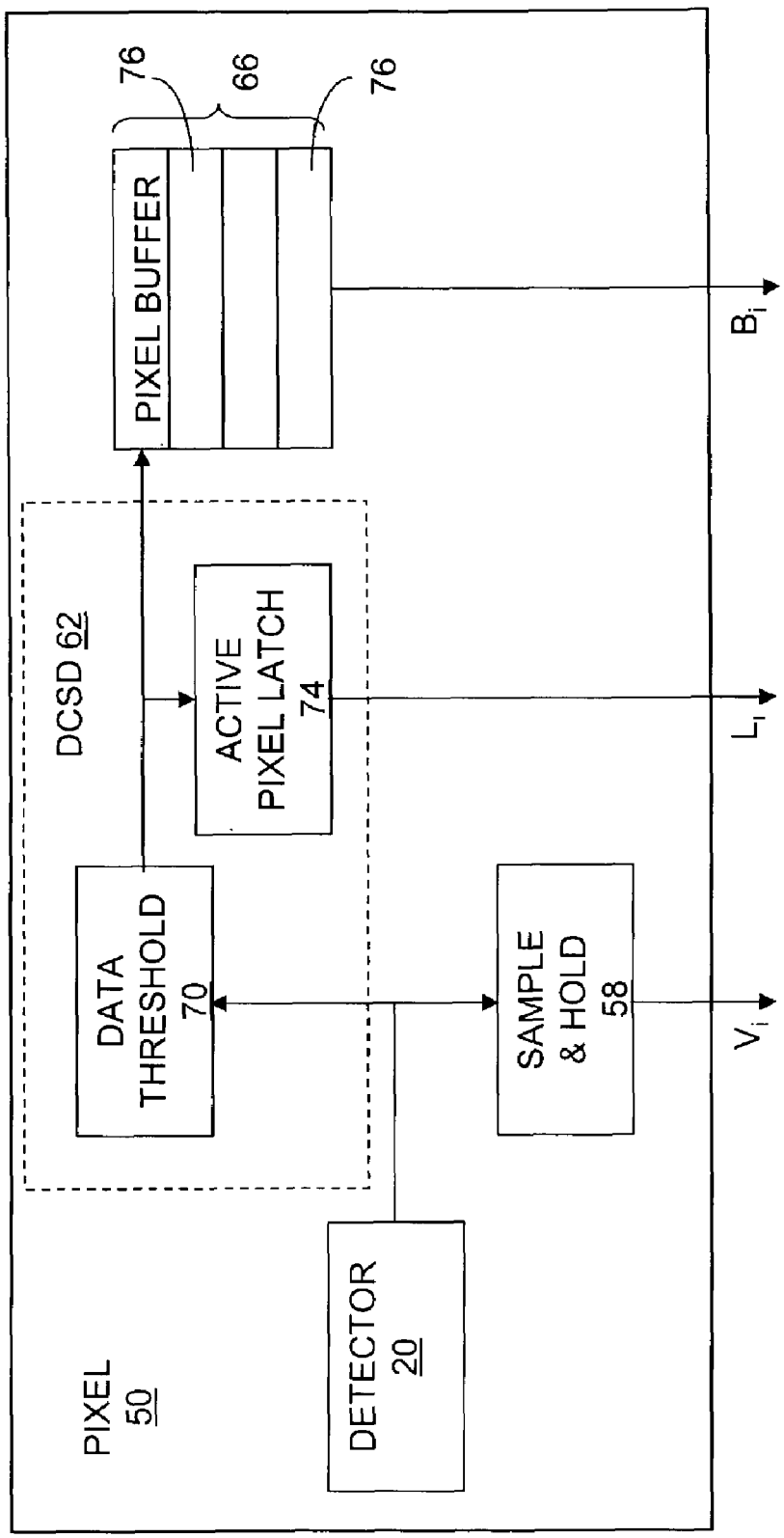
FIG. 3 is a block diagram of an embodiment of a pixel in an optical sensor in accordance with the invention.

FIG. 3 shows a block diagram of one of the pixels 50 in the sensor 14 according to one embodiment of the invention. The pixel 50 includes the optical detector 20, an analog sample and hold module 58, a data communications signal detector (DCSD) 62 and a pixel buffer 66. The DCSD 62 includes a data threshold module 70 and an active pixel latch 74. The optical detector 20 is in common communication with the sample and hold module 58 and the DCSD 62. The DCSD 62 is also in communication with the pixel buffer 66.

The detector 20 senses incident light and provides an electrical signal to both the sample and hold module 58 and the data threshold module 70 in response to the intensity of the incident light. The sample and hold module 58 samples the electrical signal according to the frequency of a video frame rate clock (not shown). The data threshold module 70 detects the presence of an active communication source 12. An active source present in the field of view of the detector 20 generates an intensity that is typically greater than the intensity resulting from the background image. The data threshold module 70 samples the electrical signal generated by the detector 20 according to the frequency of a data clock (not shown). The data sampling frequency is determined according to the requirements of the specific system application. In some embodiments, this sampling frequency exceeds 1 GHz. As the number of communication sources 12 that are accommodated by the communications imager 10 increases, the maximum achievable data sampling frequency is decreased. If the sampled electrical signal exceeds a predetermined threshold value, a logic "1" (asserted) bit is generated by the data threshold module 70 and stored in the pixel buffer 66, otherwise a logic "0" (unasserted) bit is stored. In one embodiment, the sampled electrical signal is a voltage and the predetermined threshold value is a reference voltage. In other embodiments, the reference voltage is programmable or adjustable by a user. If a logic "1" is detected at any time during a data interval, the active pixel latch 74 sets an active pixel flag bit to logic "1" to indicate that the pixel buffer 66 holds valid communications data. The data interval can be a fixed duration of time determined based on, for example, the video frame rate clock or the data clock. In one embodiment, the active pixel flag bit is reset at the expiration of the data interval. In the figure, $V_i$, $L_i$, and $B_i$ represent the analog video signal, active pixel flag bit and pixel buffer data stream, respectively, for the $i^{th}$ pixel in the imaging array 18 (FIG. 2).

Figure 4:
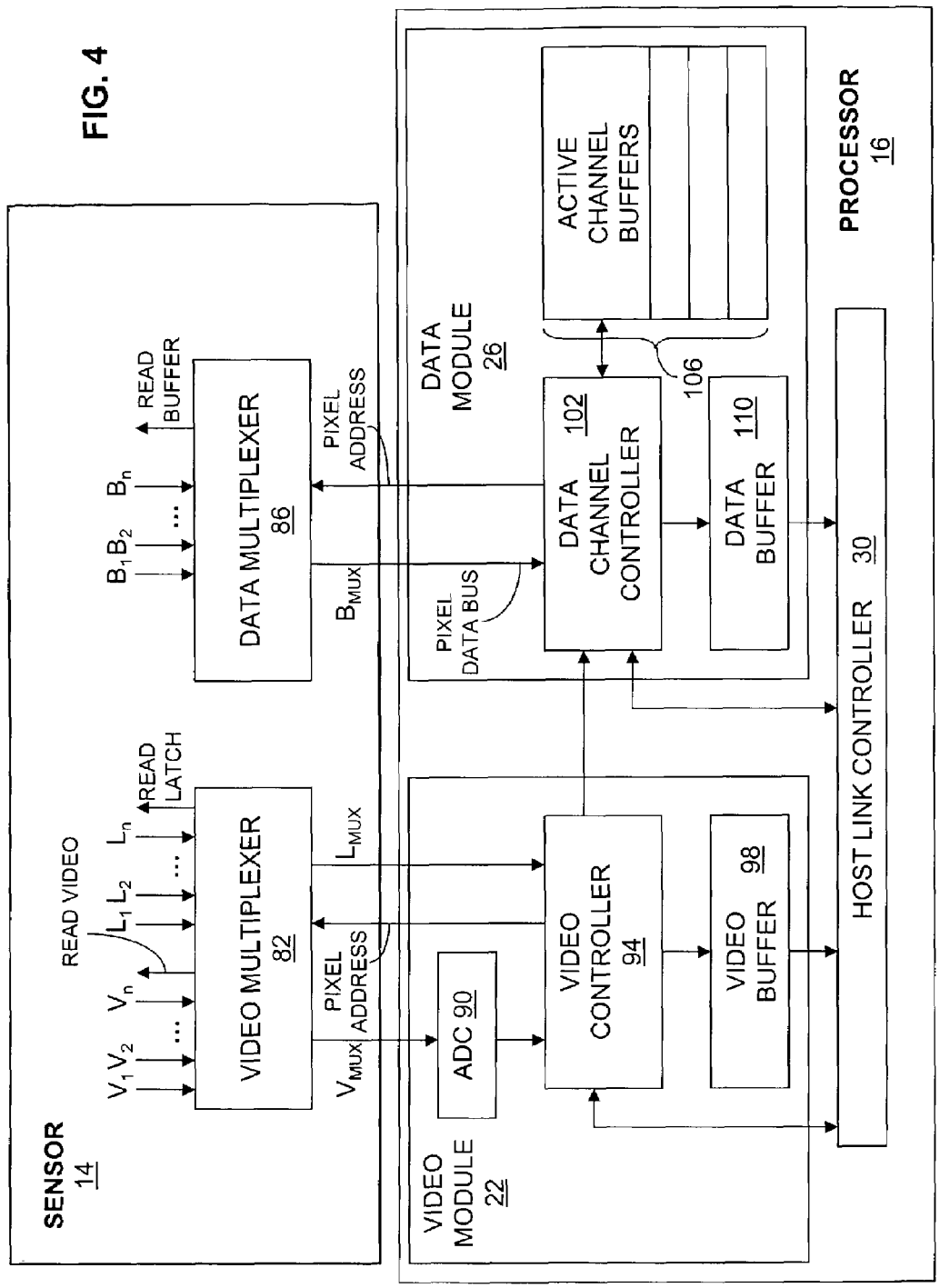
FIG. 4 is a block diagram of an embodiment of a sensor and of a processor for the optical communications imager of the present invention.

FIG. 4 depicts one embodiment of the sensor 14 and processor 16 of the optical communications imager 10. The sensor 14 includes an imaging array (not shown) having n pixels 50. Each pixel 50 communicates with a video multiplexer 82 and a data multiplexer 86. The video multiplexer 82 provides a multiplexed analog video signal $V_{MUX}$ and multiplexed active pixel flag bit $L_{MUX}$ to the video module 22 in response to received pixel address data. The data multiplexer 86 provides a multiplexed stream $B_{MUX}$ of the communications data bits stored in the pixel buffers 66 over a pixel data bus to the data module 26 in response to received pixel address data.

In one embodiment under normal operation, each pixel 50 samples and holds the intensity for each video frame cycle. The processor 16 cycles through each pixel 50 according to a video bus clock. Thus, for each clock cycle of the video bus clock, the analog video signal $V_i$ for the $i^{th}$ pixel is put on the video bus. Each active pixel flag bit $L_i$ changes in response to changes in the communication status of the respective pixels 50. Similarly, a data clock is provided to the pixels 50 at a rate approximately equivalent to the rate of communications data bits sent to the sensor 14. This data clock causes each pixel 50 to store communications bits into the pixel buffer 66. During data readout, the processor 16 cycles through each of the pixels 50 according to a data bus clock. Each clock cycle of the data bus clock allows the sensor 14 to put communication data bits from pixel i (i.e., pixel buffer data stream $B_i$) onto the data bus. In another embodiment, the data clock rate exceeds the rate of the received communications data bits. This higher data clock rate allows each pixel to operate a data communications rate that can be different from the data communications rates of other pixels.

With respect to the processor 16, the video module 22 includes an analog to digital converter (ADC) 90, a video controller 94 and a video buffer 98. The ADC 90 is in communication with the video multiplexer 82 and the video controller 94. The video controller 94 also communicates with the video buffer 98, the video multiplexer 82 via pixel address lines, the data channel module 26 and the host link controller 30.

In one embodiment of the invention, the sensor 14 is fabricated as a single integrated circuit or "chip" according to standard CMOS fabrication processes. The video data and communications data held in each pixel 50 can be accessed by providing both row and column pixel addresses. Data framing circuits, row address decoders, column address decoders and output buffers can be fabricated on the chip with the imaging array 18. Because the video data and communications data addressing circuits are independent, it is possible to access image data from one pixel 50 while accessing communications data from a second pixel 50.

One of the benefits of the sensor 14 over conventional digital video cameras is its ability to independently and concurrently read image data and communications data from separate pixels 50. This multi-functional capability allows video content to be read from the sensor 14 at data rates that are compatible with standard digital video systems while communication data are read from individual pixels 50 at substantially greater data rates. For example, the video content can be read at a few hundred frames per second or less while communications data are read at greater than 1 GHz. The video data rate is typically limited according to the number of pixels 50 in the sensor 14. In contrast, the communications data rate is typically limited by the number of active communication sources 12. As described in more detail below, the communications data in a pixel buffer 66 are read before the buffer is rewritten or overflows to avoid data loss.

The data module 26 includes a data channel controller 102, a set of active channel buffers 106 and a data buffer 110. The data channel controller 102 communicates with the data multiplexer 86, the active channel buffers 106 and the data buffer 110. The data buffer also communicates with the host link controller 30. In embodiments in which high-bandwidth communications are required, the data channel controller 102 is fabricated on the same chip as the sensor 14. In other embodiments, for applications having lower bandwidth requirements or for which a low number of communication sources are expected, the video module 22 and data channel module 26 are implemented off the chip (e.g., in a field programmable gate array (FPGA)). In other embodiments adapted for low bandwidth communications, the processor 16 is implemented in a FPGA or other programmable hardware (e.g., a digital signal processing (DSP) chip, microcontroller or microprocessor).

Figure 5:
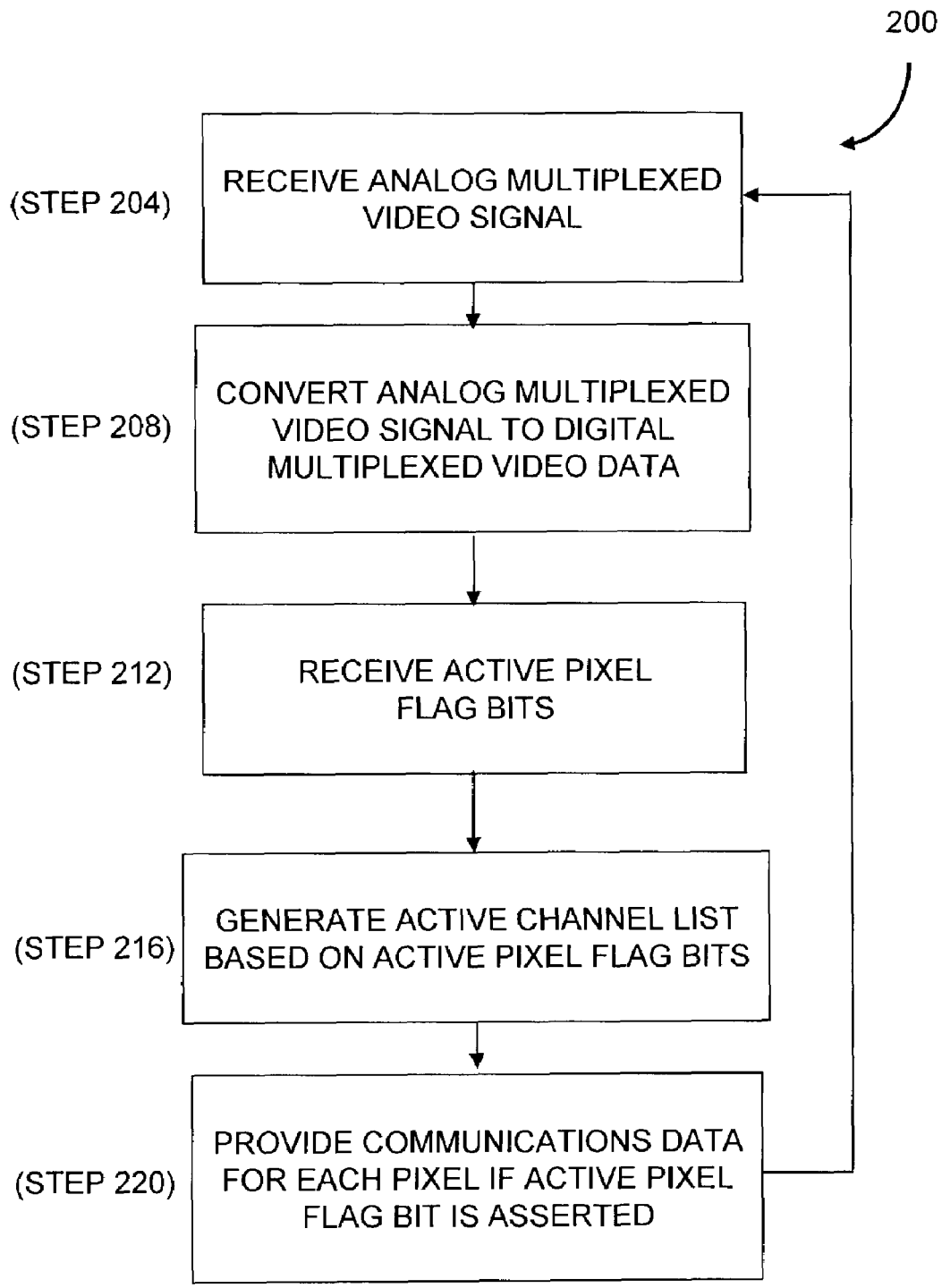
FIG. 5 is a flowchart representation of an embodiment of a method of providing communications data in accordance with the invention.

FIG. 5 depicts a method 200 of providing communications data according to the sensor 14 and processor 16 of FIG. 4. In operation, the video module 22 receives (step 204) the analog multiplexed video signal $V_{MUX}$ from the video multiplexer 82. ADC 90 converts (step 208) the multiplexed analog video signal to a digital video data stream. The video controller 94 routes the processed digital video data to the video buffer 98. The video controller 94 also receives (step 212) the multiplexed active pixel flag bits $L_{MUX}$ that indicate which pixels 50 are actively receiving optical communications data.

The data channel controller 26 manages the collection of communications data from the pixel buffers 66. Because the bandwidth required to collect high-speed communications data from all the pixels 50 is astronomical, the data channel controller 102 generates (step 216) a list of active communication data channels for data collection based on the values of the active pixel flag bits. This active channel list is stored in the active channel buffers 106. The data channel controller 102 also identifies and ignores pixels 50 that contain redundant communications data (e.g., adjacent pixels 50 that also receive light from the same optical communications source). In one embodiment, the active channel list includes additional channels used for error correction and for detecting movement of the communication sources 12 within the sensor field of view. The data channel controller 102 cycles through the active channel list to determine which pixel buffers 66 to read to obtain the communications data and the corresponding communications data are provided (step 220) (i.e., retrieved from the pixel buffers 66 of the active pixels). The method 200 is repeated and communications data continues to be provided for each established data channel until the respective active pixel flag bits are unasserted.

Figure 6:
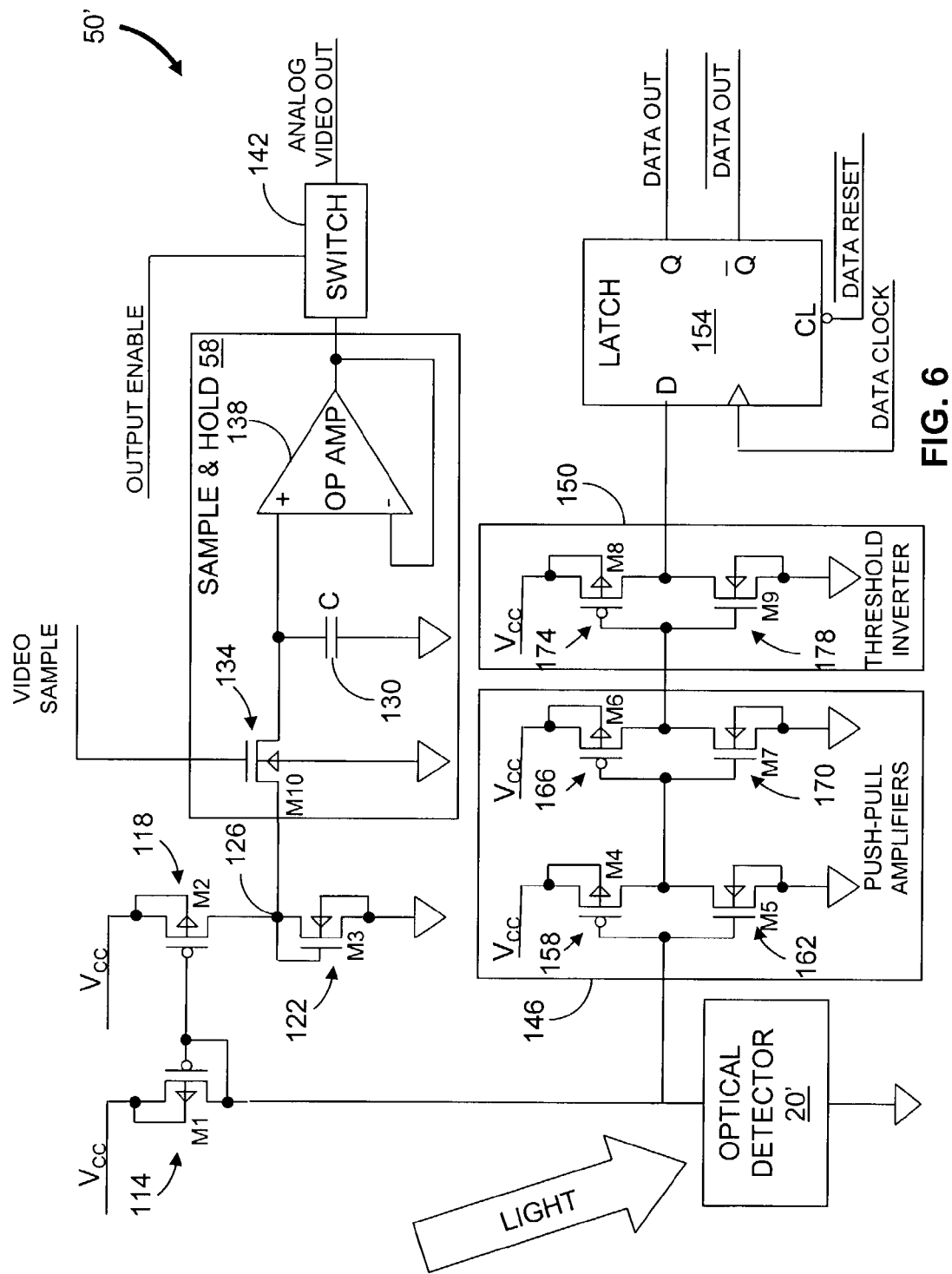
FIG. 6 is a schematic diagram of an embodiment of a circuit for a pixel in accordance with the invention.

FIG. 6 shows a diagram of the circuit in a pixel 50' according to one embodiment of the invention. The pixel 50' includes both image and communication data detection circuitry. Image circuitry includes transistors M1 114 and M2 118 coupled to each other and to a reference voltage $V_{cc}$. Transistor M1 114 is also coupled to an optical detector 20'.

A third transistor M3 122 is coupled between transistor M2 118 and ground. At node 126, an analog video signal is coupled to a capacitor C 130 through a switching transistor M10 134. An op amp circuit 138 is coupled to the capacitor C 130 and an output enable switch 142. In one embodiment, the op amp 138 is configured to provide unity gain. In other embodiments, the sample and hold circuit 58 is replaced by one of a variety of sample and hold circuits known in the art. In yet other embodiments, the components of the sample and hold circuit 58 can be separated from each other such that each pixel 50' includes only the video sample transistor M10 134 and the capacitor C 130. In these embodiments, the op amp 138 is located external to the imaging array 18. Further, in these embodiments, it is possible to reduce the number of op amp circuits 138 by time multiplexing multiple pixels 50' through a single op amp circuit 138. Time multiplexing is accomplished by allowing pixels 50' individual access to the common op amp circuit 138 through the pixel output enable switch 142.

The data communications circuitry includes a pair of push-pull amplifiers 146 in serial communication with a threshold inverter 150 and a latch 154. In the illustrated embodiment, the push-pull amplifiers 146 are implemented with transistors M4 158 and M5 162, and transistors M6 166 and M7 170, and the threshold inverter 150 is implemented with transistors M8 174 and M9 178.

During operation, in the image detection portion of the pixel 50', a photocurrent is generated through transistor M1 114 when light is incident on the optical detector 20'. Transistor M1 114 and transistor M2 118 are configured as a current mirror in order to replicate the photocurrent at a greater magnitude through transistor M2 118. The replicated photocurrent is conducted through transistor M3 122 which acts as an active load. Consequently, the analog video voltage defined at node 126 varies according to the light intensity on the optical detector 20'. When transistor M10 134 is switched to a conductive state according to a video sampling clock signal VIDEO SAMPLE, the storage capacitor C 130 is charged to the analog video voltage. When the output switch 142 is enabled according to a switching signal OUTPUT ENABLE, the ANALOG VIDEO OUT terminal transitions from a high impedance state to the output voltage provided by the op amp 138. The switching signal OUTPUT ENABLE is generated for the pixel 50' in response to the pixel address provided by the video controller 94 to the sensor 14 (FIG. 4).

In the communications data detection portion of the pixel 50', transistor M1 114 acts as an active load. As the photocurrent increases in response to an increasing light intensity at the optical detector 20', the voltage across transistor M1 114 increases. As a result, the voltage across the optical detector 20' decreases. The push-pull amplifiers 146 amplify the voltage across the optical detector 20'. The inverter 150 performs the previously described threshold function and produces digital bits that can be latched into the pixel buffer (not shown). Data is provided from the pixel buffer in response to a data enable signal. The data enable signal for the pixel 50' is generated if the data channel controller 102 provides the pixel address to the sensor 14 (FIG. 4). The optical threshold power desired for a given system application is achieved by the specific design of the threshold inverter 150. For example, the number of amplification stages and the size of the transistors can be varied to achieve the desired threshold value. In other embodiments, the threshold inverter 150 is replaced by one of a variety of threshold circuits known in the art. In some of these embodiments, the threshold circuits permit a user to program a desired threshold level. This programmability allows the sensor 14 to be used to receive data from a variety of optical communication sources 12' providing a range of intensities at the sensor 14. In other embodiments, the push-pull amplifiers 146 are replaced by one of a variety of amplification circuits known in the art.

Referring again to FIGS. 2 and 3, the minimum size of the pixel buffers 66 is selected to ensure that each buffer 66 is emptied before it overflows. The time required to fill the pixel buffer 66 is dependent on the data clock sampling rate D, the pixel buffer size K, the pixel data bus width B, the pixel data bus frequency R and the maximum number N of simultaneous active channels. The data clock sampling rate D is the rate at which new communication data bits are clocked into the pixel buffer 66. In one embodiment, the data clock "over-samples" the communications data bits in order to accommodate clock skew and variations in the data rates of the communication sources. The pixel buffer size K expressed in bits is typically a multiple of the pixel data bus width B expressed in bits. The time required to completely fill the pixel buffers 66 is therefore $$\frac{K}{D}.$$

The pixel data bus frequency R determines the time required to read B bits from the pixel buffer 66. Thus a time of $$\frac{K}{RB}$$

is required for complete transfer of all communication data bits from a pixel buffer 66.

Based on the above parameters, no incoming data communications bits are lost if the following conditions is satisfied $$\frac{NK}{RB} \le \frac{K}{D}. \tag{1}$$

Equation (1) indicates that the amount of time required to completely read all the active pixel buffers 66 is less than the time required to fill a pixel buffer 66 to ensure that no incoming data bits are lost. This equation can be rewritten as follows:

$$ND \le RB \tag{2}$$

Equation (2) more readily indicates that the rate at which communication bits are generated by the sensor 14 is less than the rate at which bits are read from the pixel buffers 66 to avoid a loss of communication data bits. Thus the number of simultaneous active data channels determines the maximum number of concurrent data communications that the sensor 14 can maintain without a risk of losing data.

The maximum number of active data channels can be less that that defined above for certain implementations of the data channel controller 102. For example, if the data channel controller 102 designates one channel as the primary data channel for a certain communication source 12 but requires an additional four channels for error correction and detection of movement of the source 12, the maximum number of simultaneous data sources for the sensor 14 is one-fifth the number defined according to equations (1) and (2). In many communication environments, the data is transmitted in bursts of packets. Thus in some burst communications instances, the processor 16 can assign active channels for a number of communication sources 12 that exceeds the calculated maximum number of communication sources 12 described above.

Figure 7:
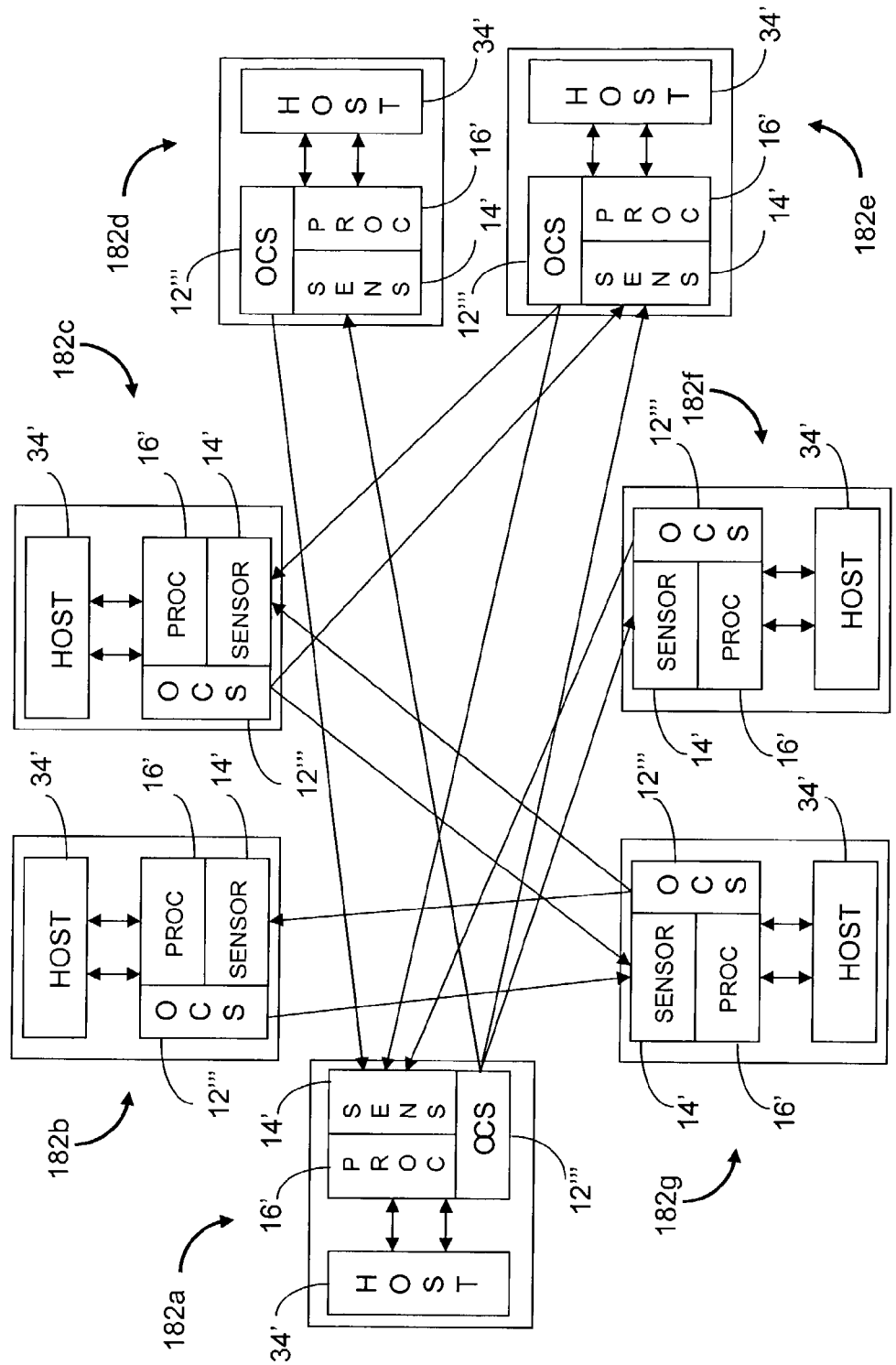
FIG. 7 is a block diagram illustrating an embodiment of a configuration of communication nodes in accordance with the invention.

Although the embodiments described above relate to a single optical communications imager 10 adapted for receiving communications from a group of optical communication sources 12, it should be recognized that other optical communications imager applications are possible. By way of illustration, FIG. 7 shows a configuration of communication nodes 182a through 182f (generally 182). Each node 182 includes an optical communications source 12''', a sensor 14', a processor 16' and a host computer 34'. Each pair of communicating nodes 182 transmits node status information and control signals over one or more data channels to aid in maintaining alignment of the optical communication sources 12 with their respective sensors 14. Communication node 182a transmits and receives data from three other nodes 182d, 182e and 182f. Communication nodes 182b, 182d and 182f communicate with only one other node 182g, 182a and 182a, respectively. Communication nodes 182c, 182e and 182g each communicate directly with either of a pair of nodes 182e and 182g, 182a and 182c, and 182b and 182c, respectively. In the illustrated embodiment, communication nodes 182c, 182e and 182g can also perform as relays, or repeaters, between their two respective communicating nodes 182 by receiving communications data from one of nodes 182 and transmitting it without modification to the other node 182. One of ordinary skill should recognize that still other configurations are possible. For example, a subset of deployed communication nodes 182 may include only communication sources 12 and another subset of communication nodes may include only sensors 14, processors 16 and hosts 34.

The optical communications imager of the present invention has a wide variety of applications. Industrial automation of factories and other manufacturing facilities can benefit because the system is deployable in harsh environments where it is impractical or impossible to install cables. Moreover, the resulting communications network is highly configurable. As communication nodes change location within the facility or as new communication nodes are added to the network, operations continue with little or no disruption. In addition, the performance of the network is not degraded by RF interference generated by motors and transformers present in the facility. Also, optical data communications do not adversely affect RF sensitive equipment located throughout the facility.

Inventory control and tracking is another area that can benefit from the use of the optical communications imager. Current state of the art inventory control systems use passive radio frequency ID (RFID) tags and radio frequency receivers to monitor inventory passing in-to and out-of a facility. Current real-time locator systems (RTLS) provide real-time location and status information on inventory within a facility, typically using active RFID transmitters. Since both types of systems rely on RF technology, they are susceptible to electrical interference, and saturation of the RF spectrum. The optical communications sensor overcomes these limitations and is well suited for these types of applications because it can communicate with optical transmitter ID tags as well as provide visual confirmation of the location and condition of inventory using image data or video data.

Automotive transportation is another area that can benefit from use of the optical communications imager. For example, an automobile equipped with the optical communications sensor of the present invention can transmit and receive speed and direction information with other similarly equipped automobiles. The optical communications imager may be augmented with a global positioning system (GPS) receiver for accurate position information. Transmitted information is used by on-board collision avoidance systems. The video capability of the system can be used to provide a video log useful for analyzing automobile accidents. In addition to data transmission between automobiles, communication sources and receivers can be deployed along streets and highways to provide a wide range of information to drivers and passengers. For example, trip route information can be entered into the automobile host computer. As traffic conditions change, real-time routing modifications are transmitted via optical communication sources located along streets and highways. Alternatively, requests for information can be transmitted from the automobile to local receivers. For example, requests can be generated to determine the location of the nearest hospital, police station, restaurant or other building or feature.

Video projectors can be augmented with an optical communications imager to read data transmitted by a laser pointer modified to perform as an optical "mouse". In operation, an image of a projection screen is formed on the optical communications imager. The laser spot projected by the laser pointer onto the projection screen is tracked to determine its "cursor position". In addition, any of a variety of messages can be transmitted from the user using the laser pointer beam, including commands typically issued by a mouse click. The optical data is then provided via the sensor and processor to a host computer controlling the projector. The laser "spot" is tracked so that multiple users, each activating and directing a laser pointer, can interact with the host computer. Optionally, the video data is captured and stored on the computer running the projector for later viewing of the presentation.

While the invention has been shown and described with reference to specific preferred embodiments, it should be understood by those skilled in the art that various changes in form and detail may be made therein without departing from the spirit and scope of the invention as defined by the following claims.

What is claimed is:

1. An optical communications processor for providing video data and communications data, comprising:
   a video module adapted to receive video data from an optical sensor having an array of optical detectors; and
   a data module adapted to receive optical communications data generated by at least one optical communications source in a field of view of the optical sensor at a communications data rate, the optical communications data for each optical communications source being received by a detector group comprising at least one of the optical detectors in the array, the data module adapted to generate an independent data communications channel for each detector group.

2. The optical communications processor of claim 1 further comprising a host link controller in communication with the video module and the data module.

3. The optical communications processor of claim 1 wherein the video module comprises a video controller adapted to receive video data from the optical sensor.

4. The optical communications processor of claim 3 further comprising a video buffer in communication with the video controller.

5. The optical communications processor of claim 3 further comprising an analog to digital converter in communication with the video controller.

6. The optical communications processor of claim 1 wherein the data module comprises a data channel controller.

7. The optical communications processor of claim 6 further comprising a plurality of active channel buffers in communication with the data channel controller.

8. The optical communications processor of claim 6 further comprising a data buffer in communication with the data channel controller.

9. A method for receiving communications data in an image formed on an away of optical detectors in an optical sensor, comprising:

receiving active pixel information identifying which of the optical detectors in the array are receiving optical communications data from an optical source in a field of view of the optical sensor; and retrieving optical communications data at a respective communications data rate from each of the optical detectors identified by the active pixel information.

10. The method of claim 9 further comprising generating a list of active communications data channels in response to the active pixel information.

11. The method of claim 9 further comprising determining if at least two optical detectors are receiving the same optical communications data.

12. The method of claim 9 wherein the active pixel information comprises a plurality of active pixel flag bits.

13. The method of claim 9 further comprising receiving video data from the plurality of optical detectors.

* * * * *